INVENTOR:
Raymond J. Moore

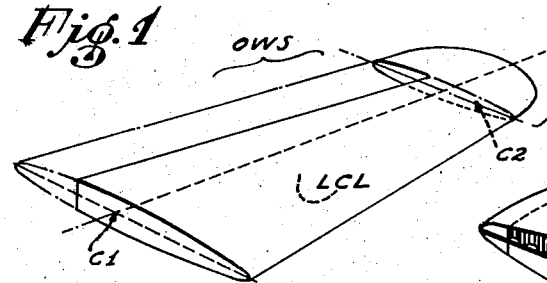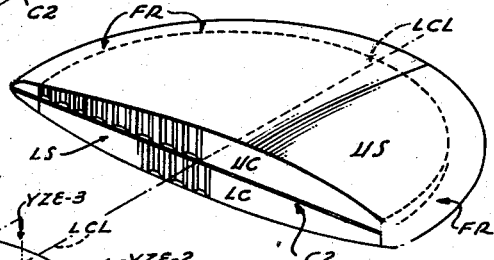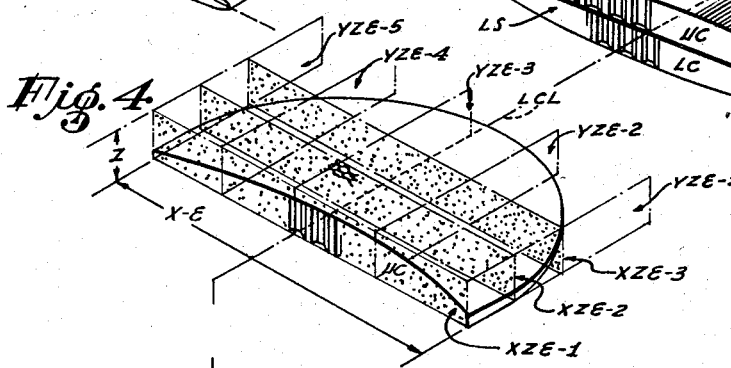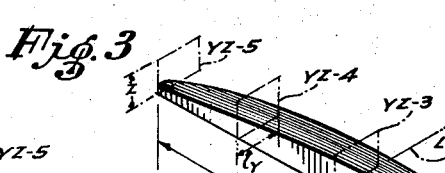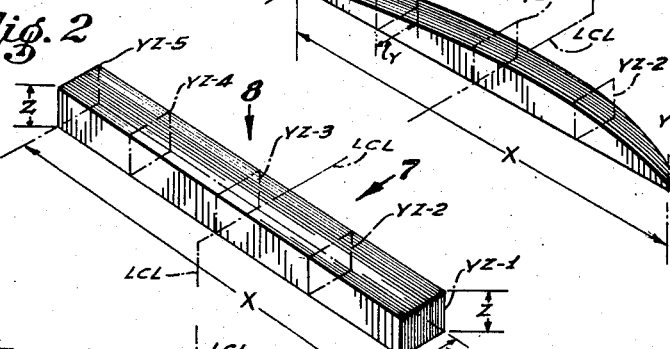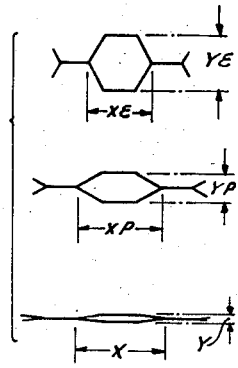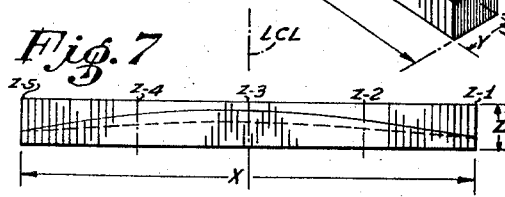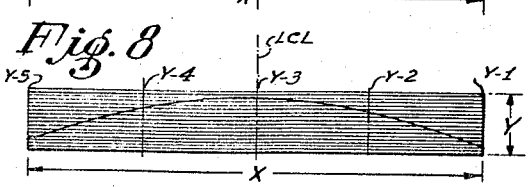

His Patent Attorney

United States Patent Office 2,885,772
Patented May 12, 1959

2,885,772

PRE-CONTOURING HONEYCOMB CORES BEFORE EXPANSION OF THE HONEYCOMB

Raymond J. Moore, Long Beach, Calif., assignor to Northrop Aircraft, Inc., Hawthorne, Calif., a corporation of California Application September 14, 1954, Serial No. 455,955

14 Claims. (Cl. 29—407)

This invention relates to the fabrication of contoured core sections of multitubular and so-called honeycomb material, and more particularly to a method of contouring honeycomb material while in the original block form so that when elongated to the normally expanded condition it will provide a core section of the predetermined size, shape and strength.

As is well known in the art, multitubular material when normally expanded is very difficult to shape peripherally because of its general flexibility and lack of stability except in the direction of the axial alignment of its tubular cells. In the normally expanded form it is neither sufficiently rigid and self supporting, nor can it be properly clamped or held in position by conventional means, to withstand the pressures and stresses imposed by machining and contouring with generally used power tools. Consequently, in the past honeycomb material has been used only in cores having simple contours consisting of tapers in a single plane and constant section curves.

The main object of this invention is to provide a method for fabricating core sections of multitubular material, imparting thereto any peripheral contour with any desired combination of compound curvatures, angles and offsets.

Another object of this invention is to provide a method by which compound peripheral contours may be produced without the use of special jigs, tooling or power tools.

A further object of my invention is the provision of a method by which any number of duplicate sections may be produced with faithful accuracy.

A still further object of my invention is the provision of a method for producing core sections having irregularly shaped peripheral conformations and variable concentrations of internal rigidity and strength to meet the requirements of external stress at any point on its surface.

In brief, my invention comprises a method of producing contoured core sections by machining unexpanded honeycomb material while in the unexpanded block form, using sectional templates or a complete three dimensional form as a machining guide, so that the precontoured material when elongated to its normally expanded form will, while remaining constant in thickness, increase in length and decrease in width in the proper proportion to provide a core form embodying the predetermined dimensions and peripheral contouring.

The method of my invention may be more fully understood by reference to the accompanying drawings and the following description of one utilization of this novel procedure. It is to be understood, however, that the present invention is not limited in any way to the specific use and apparatus shown herein since the method is applicable to other apparatus and embodiments which may also be adopted within the scope of the appended claims.

In the drawings:

Figure 1 is a perspective diagrammatic view of an outer wing section of an airplane, the trailing edge being shown in phantom to reveal internal construction of the adjacent wing tip section. The fabrication of a honeycomb core section for this wing tip will be described hereinafter.

Figure 2 is a perspective diagram of a generally rectangular slice of honeycomb material in the original, unexpanded form, showing the upwardly disposed edges of the intercellular partitioning membranes.

Figure 3 is a diagrammatic perspective view showing the rectangular block of core material in Figure 2 after being contoured.

Figure 4 is a diagrammatic perspective view of the core section in its normally expanded form resulting from the elongation of the contoured core material seen in Figure 3. Shown in phantom in the fore part of the core section is a plurality of transverse vertical planes of reference used in establishing the relative dimensions of the finished core section and the profiling patterns.

Figure 5 is a diagrammatic perspective view of a completed wing tip section comprising two half sections such as the one in Figure 4 being used to fill the space and provide stiffness between the upper and lower wing tip skin surfaces and enclosed within a semicircular structural member defining the outer edge of the wing tip.

Figure 6 is a diagrammatic end view of the slice of the core material in Figure 2, as seen in the direction of arrow 6, showing the portion of core material cut away during the contouring operation.

Figure 7 is a diagrammatic side view of the uncontoured core material seen in the direction of arrow 7 in Figure 2, and showing transverse contour lines and the areas of material to be cut away thereabove.

Figure 8 is a diagrammatic plan view of the slice of material in Figure 2 as seen in the direction of arrow 8 and showing the profile of the contoured section in relation to the original rectangular form.

Figure 6A:
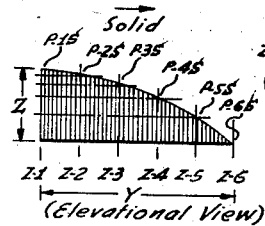
Figure 6a is a diagrammatic sectional view of a contoured core form similar to that shown in Figure 6, with vertical ordinate lines indicating measurement points.

Figure 9 includes three vertically aligned outline drawings representing cross sections of a single honeycomb cell and illustrating the dimensional changes which take place as the material is elongated from the compressed to the expanded form.

Referring again to Figure 1: the fabrication of contoured honeycomb core sections to fit within and reinforce the wing tip WT will be described in the following typical embodiment of the method of my invention. In Figure 1 the wing tip WT is shown in normal position of attachment to the outboard termination of the outer wing section OWS.

For engineering and production purposes a wing assembly such as that shown in Figure 1 is regarded as being comprised of upper and lower halves divided along a generally horizontal plane aligning with chord lines C1 and C2, and the theoretical spanwise longitudinal centerline LCL of the wing assembly. The wing tip section WT is better seen in Figure 5 showing the cross section in greater detail with the upper core UC and lower core LC enclosed in their respective skin surfaces US and LS, and bonded together along their flat surfaces disposed in the horizontal plane established by chord line C2 and the longitudinal centerline LCL, then enclosed around the outer edge within the semicircular fairing rim FR.

In the interest of descriptive accuracy, it should be pointed out before details of the method of my invention are given, that the term "honeycomb" which is generally used to classify expandable laid-up materials of this type is actually a misnomer since the material is composed of a multiplicity of axially aligned hexagonal, tubular cells, open at each end and laterally co-attached. The hexagonal tubes of which the material is composed have no transverse partitions forming individual sealed sacks such as those common to beeswax honeycomb construction from which the core material derives its somewhat misleading name.

Two types of this multitubular material are generally used in industry: the rigid type of which automobile radiators are a familiar example, made by welding or soldering together pre-contoured sheets of metal, and the expandable type which is produced by strip gumming and overlaying flat sheets of substantially flexible paper, plastic, metal and even metal foil. For convenience and economy of space in shipping, expandable honeycomb material is usually delivered to the user in compressed or unexpanded form.

A better understanding of the characteristics of this material may be had from a review of the method by which it is produced. The type of material employed depends upon the purpose and conditions under which the material will be used, and almost any substance available in flat flexible sheets is suited to the process.

Adhesive substance is applied to each sheet in uniformly spaced parallel bands, and the sheets are stacked with the adhesive bands of one paralleling and centered between those of the next sheet. The bands themselves are spaced three band-widths apart on each sheet so that a clean non-adhering band of surface area is present on one sheet or the other between each band of adhesive applied to either sheet. Thus every other longitudinal band of each sheet is affixed alternately to the sheet above or below, and when the stack of sheets is expanded each sheet is drawn in one direction along its band of attachment to the sheet above, and in the opposite direction along its band of attachment to the sheet below. These bands of attachment, regardless of the extent to which the material is expanded, remain in planes generally perpendicular to the direction of expansion but the ungummed bands, occurring alternately between the bands of attachment, are disposed angularly between the edges of the bands of attachment. It is this angular displacement of the unattached and ungummed longitudinal bands that provides the hexagonal pattern characteristic in the cells of core material of this type, and it is the crimping of the material along the longitudinal edges of these diagonally disposed bands that contribute to a large degree to the high ratio of strength to weight evidenced by this material under conditions of compressive stress. It is also the crimping and the resultant angular displacement of the ungummed longitudinal bands that causes the material to become smaller in one dimension as it is extended in length.

The first step in the practice of my invention, therefore, is to determine by means of an actual stretch test of a given amount of material the ratio of elongation necessary to extend the solid material to the normally expanded condition in which the individual cells of the honeycomb material become substantially hexagonal in cross sectional conformation, and having established the ratio of elongation, to determine therefrom the size of the solid block of material required to provide the predetermined expanded length of the core to be produced.

For instance, if a section of solid material is found to expand to thirty times its original size, the ratio of one to thirty would be used in calculating the size of the block needed to provide the desired expanded length.

If, however, unusual strength in the reinforcing core is required to overcome abnormal compressive stresses upon certain surface areas, the solid honeycomb material is expanded to less than the normal degree, thus providing a greater concentration of intercellular partitioning membranes and requiring proportionatell more of the solid material in the original solid block. Since the decrease in width is proportionate to the degree of expansion of the honeycomb block, the extent to which the honeycomb is to be expanded must be determined before the relative decrease in width can be determined.

Having determined the required expansion in length, the relative decrease in width is next determined either by reference to data supplied by the honeycomb manufacturer or by an actual physical test as follows: expanding a slice of the core material to the required length at the desired material density, and while holding the honeycomb in the expanded condition, marking thereon the desired width measurements at evenly spaced transverse lines, such as XE–1, to XE–6 in Figure 8b, parallel to the intercellular partitioning membranes and perpendicular to the longitudinal axis of the expanded core form.

Figure 8A:
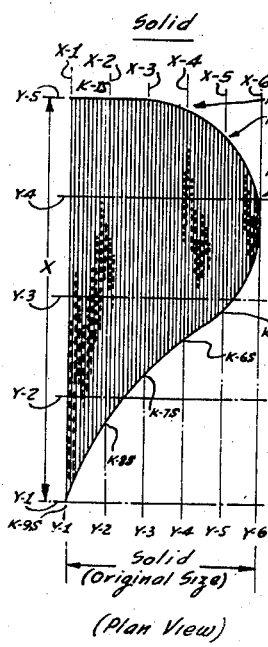
Figure 8a is a diagrammatic plan view, similar to Figure 8, of the core form shown in Figure 6a, with ordinate lines corresponding to measurement points in Figures 6a, 6b and 8b.
Figure 8B:
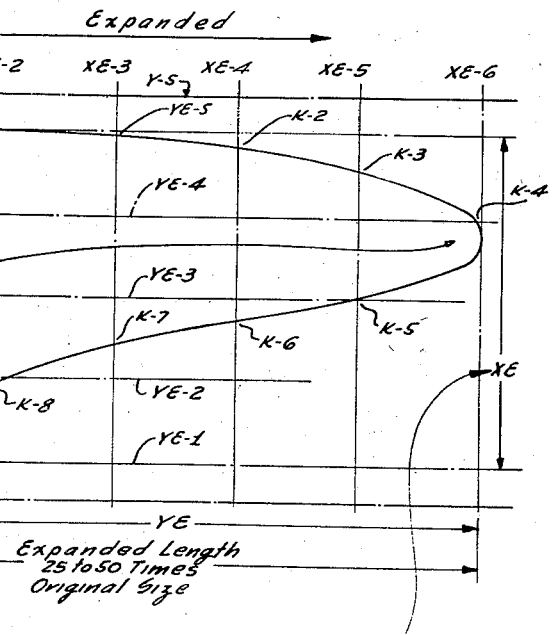
Figure 8b is also a diagrammatic plan view showing in the expanded condition a section of core material having the same original conformation as the core form of Figure 8a, and illustrates the lateral contraction occurring when the material is expanded in the direction normal to the intercellular partitioning membranes.

With these measurements recorded on paper and the reference points indicated on the honeycomb material, the longitudinal tension is relaxed, the honeycomb material is compressed to its original solid form, as shown in Figure 8a, and measurements are again made between the various reference points on transverse lines X–1 to X–6 and compared with those formerly taken along lines XE–1 to XE–6 in Figure 8b to determine the percentage of increase in width of the material.

This percentage figure showing the increase in width from the expanded condition to the solid or compressed state is most important and should be carefully checked since it is what might be called the oversize allowance and is applied to all width dimensions of the finished core form when making calculations to determine corresponding width dimensions required in the unexpanded section of solid honeycomb.

Furthermore, this percentage figure is termed the oversize allowance to distinguish it from another figure representing the percentage of shrinkage in width occurring when the material is drawn from the solid to the normally expanded condition. These two percentages are quite different, and when the percent of shrinkage figure is being used during the engineering design stages or when it is impossible to conduct the physical test previously described, care should be taken to convert the percent of shrinkage to the correspondingly larger figure of oversize allowance when making percentage calculations based upon widths of the expanded core form.

Figure 6B:
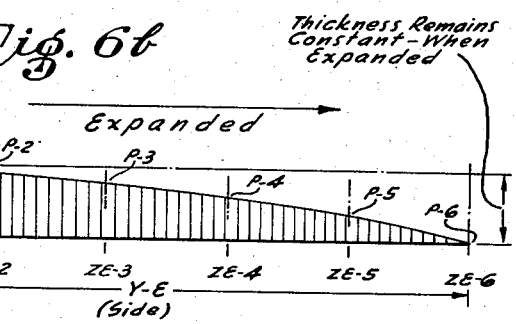
Figure 6b is a diagrammatic cross sectional view of a section of honeycomb material having the same original conformation as the contoured core form of Figure 6a, as it would appear in the expanded condition, and shows the manner in which the vertical membranes of the material separate as the tubular cells between the membranes are opened to their true hexagonal cross sectional form.

The thickness of honeycomb section measured in the direction of the tubular cell formation, such as dimension Z in Figures 6a and 6b, remains constant because of the longitudinally rigidity of the alternately parallel and diagonally disposed walls of the tubular cells of which the material is composed, and will be the same in the solid block as in the expanded core section.

Therefore, in the next step in my method which is to determine the over-all or outside dimensions of the solid block from which the core section is to be made, the thickness of the solid block, such as Z in Figure 6a, will be the same as that of the expanded core section, best seen at ZE in Figure 6b. The length of the solid block, measured in the direction of expansion of the material as seen at Y in Figures 2 and 6a and 8a, is readily determined by using the ratio determined for the material in the physical test previously explained. Similarly the width of the solid block, measured in the direction of variable size, as at X in Figures 2, 3 and 8a, will be the maximum width desired in the expanded core as at XE in Figure 8b, plus the so-called oversize allowance also determined by the previously described physical test of the honeycomb material.

Having thus established the outside or over-all dimensions of the solid block in proportionate relationship to the dimensions desired in the final expanded core form, the next step in the practice of my invention is the establishment of intermediate points of measurement about the periphery and through the body of the solid block in such a manner that they will combine to form a composite defining in all dimensions the properly proportioned surface contour needed in the unexpanded block of material to result in the desired surface conformation and dimensions in the resultant expanded core section.

It should be made clear, at this point, that preceding and following references to a solid block are made with regard to form or condition only, and the term is used to distinguish between the compacted and expanded forms or masses. In the practice of my invention, this solid block form, when fully developed by the procedure hereinafter described, will be imparted to a solid pattern made of wood or other durable substance, which will be used as a machining guide when profiling duplicates composed of blocks of unexpanded honeycomb core material. The so-called solid block form would be the same in both.

For the purpose of establishing points of measurement upon and within the solid block, a plurality of theoretical lines of reference such as YE–1 to YE–5 in Figure 8b, and a plurality of vertical planes of reference such as YZE–1 to YZE–5 in Figure 4, are disposed along the surface and through the body of the model of the core section at evenly spaced intervals parallel to the spanwise longitudinal centerline, LCL.

Next, similar and corresponding theoretical lines and planes of reference are disposed along and through the solid block at evenly spaced intervals as at Y–1 to Y–5 in Figure 8a and YZ–1 to YZ–5 in Figure 2. Since the width X of the solid block has already been enlarged sufficiently to offset the anticipated contraction occurring when the material is expanded, the lines and planes of reference will be placed farther apart in the solid block than in the core form.

A similar plurality of theoretical lines of reference such as XE–1 to XE–6 in Figure 8b and vertical planes of reference such as XZE–1 to XZE–3 in Figure 4, are disposed transversely along the surface and through the body of the core model in the direction of the wing chord and perpendicular to the lines and planes previously established. Corresponding reference lines, such as X–1 to X–6 in Figure 8a and Z–1 to Z–6 in Figure 6a, together with vertical planes generated by intersecting pairs thereof, are established in the solid block wherein they are closely spaced in accordance with the ratio of expansion of the honeycomb material being used.

With these lines and planes of reference established, measurements of the expanded core section are made along or from reference points thereon, the measurements and dimensions are then adjusted according to the ratios of difference previously described, and are re-located in proper relative positioning on the solid block.

For a specific and graphically understandable example of this procedure, reference is made to Figures 8a and 8b in which, it should be understood, no attempt has been made to show the two contoured sections in their true lineal proportion of one to from twenty-five to fifty. The decrease in width, which is usually twenty to thirty percent, is more accurately represented.

With the diagram in 8b representing the outline of the model of the expanded core form along the base plane XY, and the outline itself identified by the symbol K, the procedure is as follows: the outline, beginning at K–1, is seen to follow the longitudinal reference line YE–5 to the transverse line XE–4 which is identified as point K–2 and is relocated in the solid block in Figure 8a at a point K–2S at the intersection of lines Y–5 and X–4. Point K–3, at which the outline K intersects reference line XE–5, is established by measuring along line XE–5 from r.l. YE–5 to point K–3. To this measurement the predetermined oversize allowance is added and the sum is used in measuring inwardly from r.l. Y–5 along r.l. X–5 to locate thereon the point K–3S in the solid block. Points K–4 and K–5 on the model profile are easily re-located in the solid block. Points K–4 and K–5 on the model profile are easily re-located in the solid block with K–4S at the intersection of r.l. X–6 and Y–4, and K–5S at the intersection of r.l. X–5 and Y–3. Points K–6, K–7 and K–8 are re-located by the use of adjusted measurements made from r.l. YE–3 along lines XE–4, XE–3 and XE–2, much as was done previously in re-locating point KE–3. The position of point K–9 in the solid block is obviously at the intersection of lines Y–1 and X–1. Fairing lines, run between the relocated points, serve to complete the base line profile on the solid block.

To complete the three dimensional form of the block, the same general procedure is repeated with the calculations being made in theoretical flat planes parallel to and spaced above the base plane XE—YE. Or, in very simple forms, measurements made upwardly from the base plane on the vertical planes of reference will serve sufficiently to define the peripheral conformation of the core.

However, it should be remembered in this connection, that the thickness of the honeycomb material does not change during the lineal expansion of the material and will be the same at corresponding reference points in both the solid block and the expanded form.

As an example, reference is made to Figures 6a and 6b which show diagrammatically corresponding longitudinal sections of a contoured honeycomb core section in the compressed and expanded conditions. The symbol P is used to indicate the peripheral profile of the two forms, and it can be seen that reference points P–2 to P–5 in Figure 6b, although more widely spaced from each other, are spaced above the base line exactly the same as are points P–2S to P–5S on the periphery of the compressed form in Figure 6a.

As many reference planes and as frequent measurements thereon are used as may be required to provide the desired degree of accuracy in the pattern being made. This will vary considerably according to the relative intricacy of the surface form, and areas involving reverse contours such as a concave section in a normally convex form, abrupt axio-diametric offsets, and reverse direction tapers or undercuts should be given careful attention and carried out in much greater dimensional detail than sections having constant or consistent contours.

Conversely, some forms are relatively simple and, although three-dimensional, may require nothing more than two or more templates or single-plane contour patterns as guides in the machining operation. The presence of one or more flat surfaces in the form also serves to simplify the establishment of relative dimensions as well as the machining operations.

When all of the points of reference on the expanded form have been re-located, with suitable dimensional adjustments where required, on the solid block, fairing lines are developed around the entire periphery and the block is machined to its proper surface form for use as a profiling template in making duplicates out of sections of compressed honeycomb material.

Finally, the contoured sections of compressed honeycomb are extended either to their normally expanded length or whatever variation thereof may have been predetermined to allow concentrations of the intercellular membranes at various points to adjust for machining inaccuracies or increase the resistance to compressive stress.

To facilitate handling and installing the core section a covering sheet of relatively stiff material may be bonded to a flat side or a base plane in cases where upper and lower half-forms are to be assembled in a certain structural area.

Although, in this particular embodiment of the method of my invention, the complete core form as seen in Figure 5, is being made in two sections each dimensioned from a base plane along which they are later joined together, it is also possible to shape an ellipsoidal form of this kind by first shaping the upper surface of a generally rectangular block of solid core material, then inverting the block and supporting it in a flat-based mold, having a cavity mating with the shaped surface, while contouring the other half of the core periphery.

No claims to invention are made concerning the particular lofting procedures that may be followed in preparing the profiling pattern nor for any specific method of geometrical projection employed in arriving at the proportionate dimensional relationship of the solid block and the resultant expanded core section other than the establishment of certain dimensional ratios and the manner in which they are applied when making the calculations.

It will be obvious to those skilled in the art that there are many uses for the method of my invention and various apparatus embodiments are also apparent. The present invention, therefore, is not limited to the particular embodiment and use which has been herein described in order to comply with the statute, and it is to be limited only by the scope of the appended claims.

What is claimed is:

1. The method of fabricating a honeycomb core section of predetermined size and shape, comprising: cutting and shaping a block of unexpanded honeycomb material to relatively proportioned peripheral contours and dimensions which, when the material is elongated to the normally expanded condition wherein the length is increased and the width decreased, will provide the predetermined peripheral conformation and dimensions in the finished workpiece; then elongating said block of material by restraining one of the ends of said block disposed normal to the direction of expansion of the material and exerting outward pressure applied uniformly along the opposite end normal to said direction of expansion, said outward pressure being continued until all of the individual tubular cells of which the honeycomb material is composed are opened axio-diametrically to the generally hexagonal cross sectional configuration characteristic of said normally expanded condition.

2. The method of fabricating a honeycomb core section of predetermined size and shape as desired in claim 1, and an initial step in addition thereto, comprising: determining the ratio of expansion characteristic of the particular multitubular material being used by means of an actual stretch test wherein a section of the unexpanded honeycomb is accurately measured in the direction of expansion, then elongated to the normally expand condition in which all of the individual tubular cells assume the conformation of right hexagonal prisms, and, finally, the normally expanded section is measured to obtain the second factor in said ratio of expansion.

3. The method of fabricating a honeycomb core section of predetermined size and shape as described in claim 2, together with a second initial step, comprising: determining the extra width required in the unexpanded section of honeycomb material to offset the decrease in width occurring when the material is elongated to the normally expanded condition, said determination of the extra width or oversize allowance being made by elongating a wide section of solid material to the normally expanded condition, marking thereon a transverse line of reference disposed at right angles to the direction of expansion of the material and to the direction of axial alignment of the tubular cells, marking on said line the maximum width of the core section to be fabricated and recording the lineal measurement thereof, releasing the tension employed to expand the material, recompressing said material to its original compact state, taking lineal measurement between said width marks on said transverse line of reference and resolving the difference between this and the first measurement to a percentage figure based upon said first measurement as 100 percent.

4. The method of fabricating a honeycomb core section of predetermined size and shape as set forth in claim 3 and, in addition thereto, other steps comprising: determining the contour required in the solid block form to provide the desired peripheral conformation when elongated to the normally expanded condition by establishing a plurality of lines of reference along the surface and a plurality of vertically disposed transverse and longitudinal planes of reference evenly spaced apart through the body of a model of the finished core form to be fabricated; establishing corresponding pluralities of lines and vertically disposed transverse and longitudinal planes of reference on and through said solid block form, said transverse planes being closely spaced compared to said transverse planes in said core model in proportion to the previously determined ratio of expansion of the material, and said longitudinal vertical planes of reference being more widely spaced in said solid block form than in said core model in accordance with the previously determined so-called oversize allowance; establishing a plurality of reference points upon the surface of said core model along the lines of its intersection with said vertical planes of reference; relocating each of said reference points disposed on said core model at its corresponding point on said solid block form; establishing fairing lines connecting said reference points upon the solid block form to completely define the size, shape and surface conformation of the solid block of honeycomb core material which, when elongated to the normally expanded condition, will constitute the predetermined core section.

5. The method of fabricating a honeycomb core section of predetermined size and shape as set forth in claim 4 and steps in addition thereto, comprising: preserving the complete form and peripheral contouring of said solid block form by coating the surface thereof with a smooth and durable material whereby said block is adapted for use as a three dimensional pattern in a conventional profiling machine; using said block as a pattern and profiling from a solid section of compressed honeycomb material a duplicate of said solid block form; elongating said section of compressed honeycomb material by imposing uniform restraint along one of the ends thereof relative to the direction of expansion, and exerting outward tension uniformly along the opposite end thereof until all of the individual tubular cells of which the honeycomb material is composed become generally hexagonal in cross sectional conformation and vertically disposed substantially in the form of right hexagonal prisms.

6. The method of profiling the outer surface of a section of compressed honeycomb material, then elongating it to the normally expanded form as set forth in claim 5 together with additional steps comprising: checking the accuracy of an expanded core form by fitting outline templates, made along established longitudinal planes of reference vertically disposed through the body of the predetermined core form model, around the body of expanded core material, and flexing and respacing the upwardly disposed cell ends of the core material to vary the spacing of the intercellular membranes of the material until those of proper height are in correct spaced position relative to the length of the core form, and all fit within the concavities of the profile templates.

7. The method of fabricating a honeycomb core section having at least one flat surface to provide a base plane, by contouring the honeycomb material while still in the unexpanded condition then elongating it to the normally expanded form as set forth in claim 6, together with the following additional steps, comprising: expanding the solid block of honeycomb material while supporting it in inverted position in a rigid mold having a cavity adapted to receive and mate with the contoured periphery of the core form extending outwardly from said flat base plane; then making lineal adjustments by stretching or compressing the honeycomb until it is completely nested within said mold cavity and its upwardly disposed flat base plane aligns with the face of the mold around the cavity thereof.

8. The method of fabricating a contoured section of multicellular material, said material being expandable in one dimension, fixed in another dimension and variable in the third dimension in inverse relation to the degree of expansion of the material, and said contoured section being of compound and variable contour, such as ellipsoidal, in peripheral conformation and having no flat surface adapted for use as a base for supporting the material during the final machining operations, substantially as set forth in claim 6 with steps additional thereto comprising: preparing profiling form blocks in the form of upper and lower halves, each having a flat axio-diametric through section adapted to serve as a base; preparing a mold of said upper half of said form block; cutting a generally rectangular solid work piece of unexpanded honeycomb material and securing it in work position by pressure means concentrated within the lower half of the material; profiling the upper half of said work piece using said upper half of said form block as a machining guide; inverting the workpiece and fitting the contoured portion thereof into the cavity of said mold of the upper half of the form block; securing the work piece within said cavity with a suitable clinging agent and profiling the upwardly disposed lower half portion thereof using the lower half portion form block as a machining guide; removing the work piece from the supporting mold and elongating the work piece to the normally expanded condition characteristic of the particular honeycomb material and the predetermined size and conformation of the finished fully contoured section.

9. The method of fabricating a contoured honeycomb section as set forth in claim 8, wherein the elongation of the honeycomb material to the normally expanded condition includes additional steps, comprising: preparing a half mold of the model of the finished honeycomb section being fabricated, said mold extending around one longitudinal half of the body of said model from a plane intersecting said model body along the theoretical longitudinal centerline and diameter of greatest length thereof; placing the completely contoured section of solid honeycomb material in the cavity of said mold and supporting it therein while elongating said material to the normally expanded condition; spraying the exposed half portion extending outwardly of said mold with air drying, quick hardening, resinous material adapted to stiffen the material and set the creased seams along the intercellular lines of attachment; then removing the section from the mold and spraying the newly exposed surface in like manner, thereby stiffening all of the exposed cell ends and wall areas about the entire periphery of the section and maintaining the section in substantially the normally expanded condition.

10. The method of fabricating a honeycomb core section as described in claim 9 and, additionally, the step comprising: before removing said core section from said rigid mold, bonding to the upwardly disposed cell ends aligning in the flat plane of the face of the mold, a sheet of relatively stiff stock whereby said cell ends are held in proper spaced relationship until the core section is installed in the structure; removing said core section from said mold cavity and trimming off portions of said sheet stock extending beyond the base line profile of the core form.

11. The method of fabricating a honeycomb core section being substantially ellipsoidal in peripheral conformation, comprising: establishing a theoretical central plane of reference disposed through the body of the ellipsoidal core so as to include the line of greatest length and greatest width thereof, and adapted to serve as a base plane in making calculations and measurements defining the size and surface conformation of the two complementary half cores extending outwardly therefrom; fabricating the two half cores separately according to the method set forth in claim 10, and combining the two half cores into the complete ellipsoidal form by bonding together the respective stiffening sheets thereof to maintain said half cores in firm juxtaposition and profile alignment.

12. The method of fabricating an ellipsoidal core form of multitubular or so-called honeycomb material substantially as set forth in claim 11 except for a slightly different method for combining the two half cores, comprising: bonding one of said flat stiffening sheets to the upwardly disposed cell ends aligned in the flat base plane of the first of said half cores; removing said first half core from the rigid positioning mold in which it was supported; trimming off the portions of sheet material extending beyond the base profile of the core form; inverting said first core so that the stiffening sheet thereof is disposed downwardly, and centering it upon the upwardly disposed cell ends of the second of said half cores while said second core is still supported within a positioning mold; rotating said stiffening sheet laterally against the face of said second core form until the two outlines thereof coincide, then bonding said sheet to said cell ends of said second half core to complete the core form of predetermined ellipsoidal conformation.

13. The method of pre-contouring honeycomb core material before expansion of the honeycomb comprising determining the ratio of expansion between expanded and unexpanded honeycomb material; plotting reference points on the unexpanded material that coincides with reference points plotted on the expanded material; connecting the reference points by drawn lines; and machining the unexpanded honeycomb core material along the lines.

14. The method of pre-contouring honeycomb core material before expansion of the honeycomb comprising determining the ratio of expansion between expanded and unexpanded honeycomb material; applying a three dimensional imaginary grid to an expanded as well as unexpanded section of material; plotting reference points on the unexpanded material, within the grid, that coincides with reference points plotted on the expanded material; connecting the reference points by drawn lines; and machining the unexpanded honeycomb core material along the lines.

References Cited in the file of this patent

UNITED STATES PATENTS

| | | |
|---|---|---|
| 1,948,837 | Avery | Feb. 27, 1934 |
| 2,212,481 | Sendzimir | Aug. 20, 1940 |
| 2,253,384 | Lown | Aug. 19, 1941 |
| 2,385,352 | Davis | Sept. 25, 1945 |
| 2,428,979 | May | Oct. 14, 1947 |
| 2,608,502 | Merriman | Aug. 26, 1952 |
| 2,654,686 | Hansen | Oct. 6, 1953 |
| 2,728,479 | Wheeler | Dec. 27, 1955 |
| 2,756,496 | Holland | July 31, 1956 |